US009635514B2

(12) United States Patent
Gilbert et al.

(10) Patent No.: US 9,635,514 B2
(45) Date of Patent: Apr. 25, 2017

(54) IDENTIFICATION OF A SUBJECT IN A FACILITY

(71) Applicant: Mayo Foundation for Medical Education and Research, Rochester, MN (US)

(72) Inventors: Barry K. Gilbert, Rochester, MN (US); Mark E. Vickberg, Rochester, MN (US)

(73) Assignee: MAYO FOUNDATION FOR MEDICAL EDUCATION AND RESEARCH, Rochester, MN (US)

( * ) Notice: Subject to any disclaimer, the term of this patent is extended or adjusted under 35 U.S.C. 154(b) by 0 days.

(21) Appl. No.: 14/678,285

(22) Filed: Apr. 3, 2015

(65) Prior Publication Data

US 2015/0289112 A1    Oct. 8, 2015

Related U.S. Application Data

(60) Provisional application No. 61/975,278, filed on Apr. 4, 2014.

(51) Int. Cl.
*H04W 4/04* (2009.01)
*H04W 4/02* (2009.01)
(Continued)

(52) U.S. Cl.
CPC ............ *H04W 4/04* (2013.01); *G06Q 50/265* (2013.01); *H04B 3/54* (2013.01); *H04W 4/027* (2013.01)

(58) Field of Classification Search
CPC ......... G01S 5/0294; G01S 13/06; H04W 4/04
See application file for complete search history.

(56) References Cited

U.S. PATENT DOCUMENTS

| 2005/0093709 A1* | 5/2005 | Franco | A61B 5/1112 340/686.1 |
|---|---|---|---|
| 2010/0308999 A1* | 12/2010 | Chornenky | G08B 6/00 340/573.1 |

(Continued)

OTHER PUBLICATIONS

T. Carozzi, et al., "Parameters Characterizing Electromagnetic Wave Polarization", Swedish Institute of Space Physics, The American Physical Society, Uppsala, Sweden, Feb. 2000, pp. 2024-2028.

(Continued)

*Primary Examiner* — Myron K Wyche
(74) *Attorney, Agent, or Firm* — Yakov Sidorin; Quarles & Brady LLP

(57) ABSTRACT

Method for identifying a location of a subject in a facility and a corresponding system including a kinematic sensor configured to detect a change in subject's mechanical characteristic, and a communications unit. Communications unit includes a controller configured to receive feedback from the kinematic sensor and a unit transceiver controlled by the controller to transmit a first radio frequency (RF) signal communicating the change. The system may include a housing facilitating coupling of the kinematic sensor with the subject, and at least one facility transceiver unit arranged in a fixed location to extract the first RF signal relative to an RF pattern and to produce an output signal. A processor is configured in communication with the facility transceiver unit (wirelessly or over the facility's power wire) to receive the output signal and to generate data representative of a location of the subject relative to the fixed location.

24 Claims, 10 Drawing Sheets

(51) Int. Cl.
*H04B 3/54* (2006.01)
*G06Q 50/26* (2012.01)

(56) References Cited

U.S. PATENT DOCUMENTS

| | | | | |
|---|---|---|---|---|
| 2011/0095748 A1* | 4/2011 | Dvorak | ............... | G01V 3/104 |
| | | | | 324/76.39 |
| 2011/0161111 A1* | 6/2011 | Dicks | ............... | A61N 1/08 |
| | | | | 705/3 |
| 2011/0181509 A1* | 7/2011 | Rautiainen | ............... | G06F 3/017 |
| | | | | 345/158 |
| 2014/0210660 A1* | 7/2014 | Larose | ............... | G01S 13/08 |
| | | | | 342/146 |
| 2014/0210671 A1* | 7/2014 | Larose | ............... | G01S 5/14 |
| | | | | 342/450 |

OTHER PUBLICATIONS

Ali Panahandeh, et al., "A Time-Variant Statistical Model for the Polarizaion of Received Electromagnetic Waves in Indoor Communication Channels", ICTEAM Electrical Engineering Department, Universite catholique de Louvain (UCL), Workshop on Computing, Networking and Communications, pp. 262-266.

\* cited by examiner

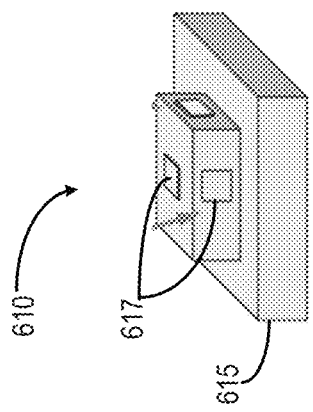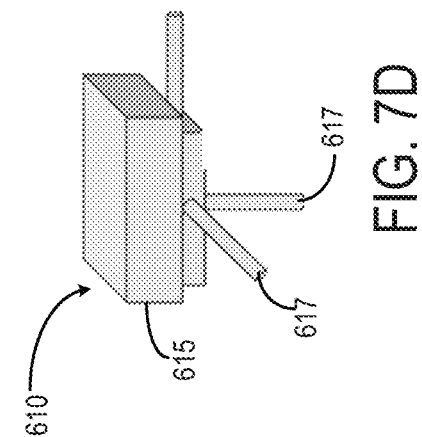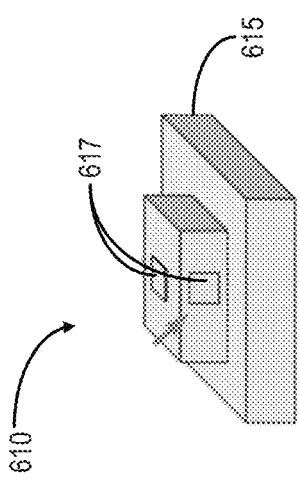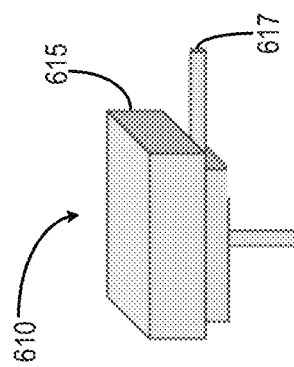

IDENTIFICATION OF A SUBJECT IN A FACILITY

CROSS-REFERENCE TO RELATED APPLICATIONS

The present application claims priority from and benefit of the U.S. Provisional Patent Application No. 61/975,278 filed on Apr. 4, 2014 and titled "Identification of a Subject in a Facility". The disclosure of the above-identified provisional application is incorporated by reference herein.

BACKGROUND

The present invention relates to systems and methods for identifying a position of a subject within a facility. More particularly, the invention relates to a system and method for identifying a position of a subject who may have fallen within the indoor facility based upon a change in position or derivative thereof, for example, as detected by a body-worn unit.

Falls are one of the most common causes of detriments to the elderly, as has been documented by many clinical studies over the past several years. When individuals fall in their workplaces, they are usually discovered quite rapidly. However, if individuals fall in their private residences, they may or may not be discovered in a timely manner, depending on whether they live alone. Several alerting mechanisms for fall reporting in private residences are currently available. For example, several alerting systems are available in which the individual wears an electronic pendant on a chain around the neck and is instructed to push a button on the pendant following a fall. If they push the button successfully, help is dispatched from a central call center to the individual's residence.

However, when individuals fall in large eldercare facilities, they may or may not be found quickly because it may not be known that the individual has fallen, and especially where they have fallen. Even a generalized warning message that an individual has fallen may not be sufficient to get prompt care to the individual in a large facility, particularly if their whereabouts are unknown. Additionally, if the individual is incapacitated and unable to push a button or otherwise effectuate a warning message, whether in a private residence or an eldercare facility, significant amounts of time may elapse before they are discovered. If fallen individuals are "down" for more than about 15 minutes prior to rescue, their physiological status begins to dramatically degrade with time.

Thus, there is a need for systems and methods to identify a position and/or location of a fallen subject that operate autonomously within a large facility where conventional alerting mechanisms do not provide location data relative to the patient or operate without conscious intervention on the part of the fallen individual.

SUMMARY

The present invention overcomes the aforementioned drawbacks by providing systems and methods for instantly detecting, geolocating, and reporting falls of individuals without any required conscious intervention on the part of the individual, such as may be particularly useful with respect to, for example, residents of eldercare facilities.

Implementations of the invention provide a system for identifying a location of a subject relative to a facility. The system includes a kinematic sensor configured to detect a change in at least one of position, velocity, and acceleration thereof and a communications unit. The communications unit includes a controller, configured to receive feedback from the kinematic sensor and a unit transceiver controlled by the controller to transmit a first radio frequency (RF) signal (or, alternatively, a signal over a wired transmission, for example over the building power wiring or other specifically dedicated wiring), communicating the change in at least one of position, velocity, and acceleration. The system also includes a housing configured to facilitate coupling of the kinematic sensor with the subject, at least two facility transceivers configured to be arranged in fixed locations and to detect the arrival of the first RF signal and to produce an output signal, and a processor in communication with the at least two transceivers to receive the output signal and configured to generate data representative of a location of the subject relative to the fixed locations, based on the processor's computation of the time difference of arrival of the first RF signal at the two or more facility transceivers.

In addition, a method is provided for identifying a location of a subject relative to an indoor facility. The method includes coupling a kinematic sensor to the subject to detect a change in at least one of position, velocity, and acceleration of the subject and transmitting a radio frequency (RF) signal using a communications unit responsive to the kinematic sensor to communicate the change in at least one of position, velocity, and acceleration of the subject. The method also includes acquiring said RF signal by at least two facility transceivers disposed in fixed locations by interpreting an RF interference pattern associated with the RF signal, determining a relative location of the subject with respect to the fixed locations and the change in at least one of position, velocity, and acceleration of the subject, and generating a report indicating the relative location of the subject.

Also, a system is provided for identifying a location of a subject relative to an indoor facility. The system includes a kinematic sensor configured to detect a change in at least one of position, velocity, and acceleration and a communications unit. The communications unit includes a controller configured to receive feedback from the kinematic sensor and a unit transceiver controlled by the controller to transmit a first radio frequency (RF) signal communicating the change in at least one of position, velocity, and acceleration. The system also includes a housing configured to facilitate coupling of the kinematic sensor with the subject and at least one facility transceiver configured to acquire said first RF signal and generate an output. The system further includes a processor communicating with the at least one transceiver to receive the output and configured to determine a unique location identifier of the at least one facility transceiver to derive, from at least the output signal and the unique location identifier, a location of the subject relative to the at least one facility transceiver.

BRIEF DESCRIPTION OF THE DRAWINGS

In the following description, reference is made to the accompanying drawings made generally not-to-scale, which illustrate some embodiments of the invention and in which:

FIG. 7A is a perspective view of a polarization patch antenna and receiver assembly that may be used with the system of FIG. 6.

FIG. 7B is a perspective view of a polarization antenna and receiver assembly that may be used with the system of FIG. 6.

FIG. 7C is a perspective view of a patch antenna and receiver assembly that may be used with the system of FIG. 6.

FIG. 7D is a perspective view of a monopole or dipole antenna and receiver assembly that may be used with the system of FIG. 6.

DETAILED DESCRIPTION

The following can be utilized to further build upon the technical subject matter disclosed in U.S. patent application Ser. No. 13/266,437 filed on Jan. 11, 2012, the disclosure of which is incorporated herein by reference.

Figure 1:
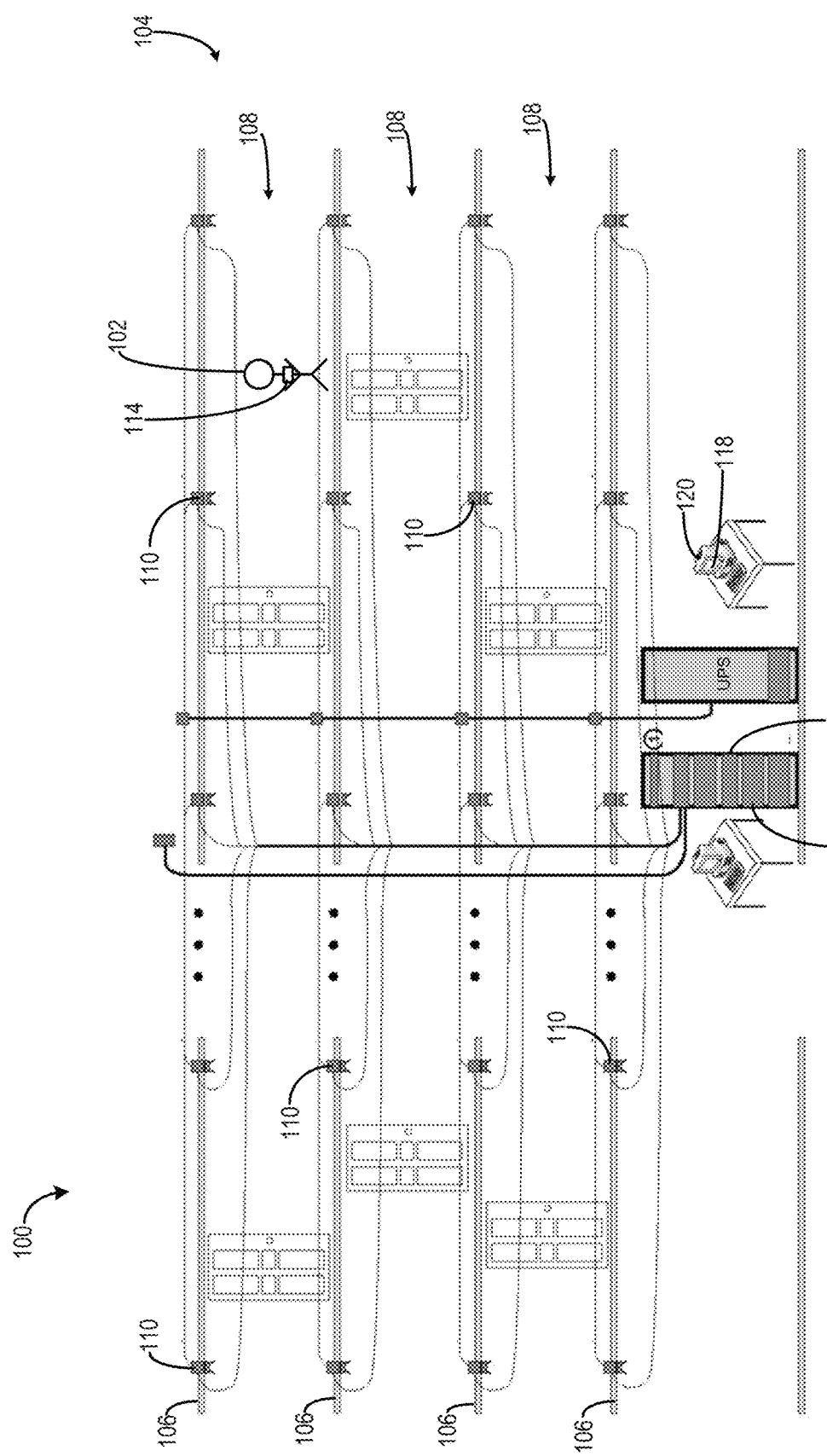
FIG. 1 is a diagram illustrating an implementation of the system for identifying a position of a subject using at least two facility transceivers within a facility in accordance with the present invention.

Referring to FIG. 1, a system 100 is shown that is configured to identify a position or location or other information about a subject 102 (such as an elderly person) within a facility 104, which may be an indoor facility, for example, an eldercare facility or a home. As used herein, "position" will be used to refer to the physical orientation of a person's body, such as lying in a prone position, lying in a supine position, arranged in a sitting position, standing in a vertical position, and the like. Furthermore, "location" will be used to refer to the space that the person occupies relative to the facility 104.

Within the facility 104, electrical connections 106 (which may include conduits, cabling, and other dedicated and non-dedicated paths) are installed. For example, conduits may be installed along the top edges or in the ceilings of corridors 108 on each floor of the facility 104 and terminate in electrical junction boxes having facility transceivers 110. Alternatively, the required power and data cables may be installed without conduits per National Electric Code and local building regulations. The facility transceivers 110 may be contained within the small electrical junction boxes, for example, and positioned at regular intervals along the corridors 108, with the electrical conduits 106 coupled to a central base station 112 in the facility 104. Within the electrical conduits 106 are one or more coaxial, fiber optic, and/or data (for example Ethernet) cables that connect the facility transceivers 110 to the central base station 112. The facility transceivers 110 may be, for example, small radio frequency (RF) transceivers, either wired or wireless, built to continuously receive the RF transmission from an electronic unit or communications unit 114 (general views of which are presented in FIGS. 9A, 9B, 9C, and 9D. The unit 114 may be arranged in a housing judiciously structured to facilitate the wear of the unit by the subject 102. (The communication unit 114 includes a "physiological unit" or a "physiological monitor subsystem" build therein as well as a microcontroller, electronic circuitry to monitor various physiological variables of a subject (motion, respiration, ECG and, optionally, analytes such as blood oxygen saturation, blood glucose for example), nonvolatile tangible memory for long-term data storage, transmitter electronics, and an antenna. As shown in FIGS. 9A, 9B, 9C, 9D, the electronic circuitries of the unit 114 are located on the circuit board labeled 128; the battery is denoted as 126. All of the electronic subsystems are controlled by the unit's microcontroller.) As will be described, the system can detect when the subject 102 has fallen. When the unit 114 of the subject 102 is in communication with at least one (and, for more detail, two) facility transceiver units 110 with fixed or known locations within the facility, the system also determines a position or location of the subject 102 within the indoor facility 104 when the subject 102 is unable to rise from the fallen position. The system is structured to show the position or location of the subject 102 on a display 118 operably coupled to a data-processing system, such as a networked workstation 120, for example, and overlaid on a schematic view (e.g., a plan view, an orthographic projection, a map, or the like) of the indoor facility 104, so that assistance can be dispatched promptly to the location of the subject 102.

Figure 9A:
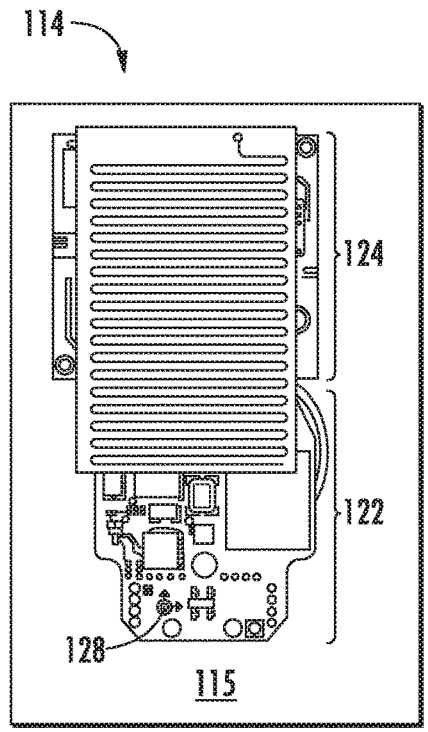
FIG. 9A is a top perspective view of an electronic unit to be carried by the subject in accordance with the present invention.
Figure 9B:
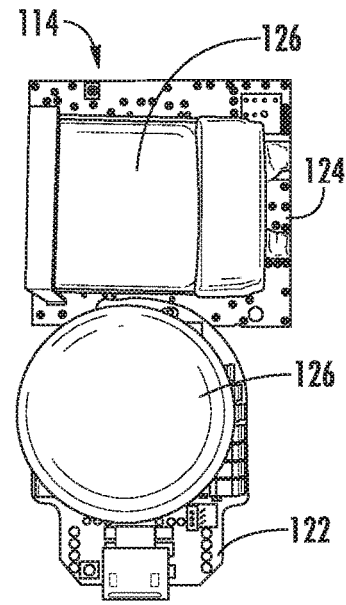
FIG. 9B is a bottom perspective view of the electronic unit of FIG. 9A.
Figure 9C:
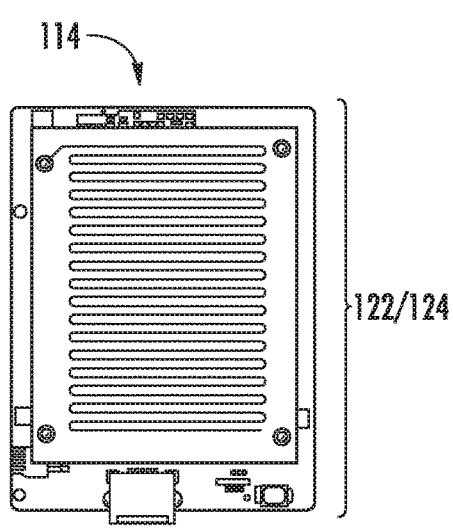
FIG. 9C is a top perspective view of an alternative electronic unit to be carried by the subject in accordance with the present invention.
Figure 9D:
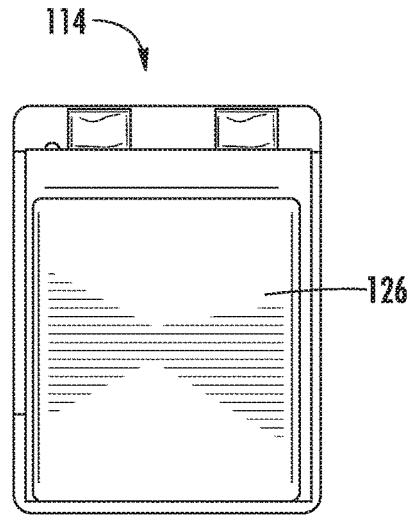
FIG. 9D is a bottom perspective view of the electronic unit of FIG. 9C.

Referring now to FIG. 2 and FIGS. 9A, 9B, 9C, 9D, a flow chart setting forth an example of a sequence of steps 200 for identifying the position of the subject within the indoor facility is provided. To start the process, the electronic unit 114 is coupled to the subject at process block 202. The electronic unit 114 may be a body-worn unit that includes, but is not limited to, controller 122, a unit transceiver 124, a battery 126 and a kinematic sensor 128, such as an accelerometer. The electronic unit 114 may combine its controller 122 and the unit transceiver 124 on a single platform, as shown in FIGS. 9C and 9D. Alternatively, the electronic unit 114 may have separate but connected platforms for the controller 122 and the unit transceiver 124, as shown in FIGS. 9A and 9B. The controller 122, as shown at process block 204 in FIG. 2, may have program code structured to implement, when loaded on a programmable processor, an algorithm for detection of the fall of the subject and his inability to rise from the fallen position. Also, as will be described, the controller may simply communicate information and such algorithms may be performed remotely.

The unit transceiver 124, as shown at process block 206, is configured to continuously, or at predetermined intervals, receive an output from the kinematic sensor 128 at process block 208. The output of the kinematic sensor 128 may be, for example, data representing the rate of acceleration in three orthogonal directions: x (representing an anterior-posterior direction), y (representing, for example, a medial-lateral direction) and z (representing, for example, a vertical direction). The output data generated by the kinematic sensor 128 may be continuously transmitted by the unit transceiver, or only transmitted by the body-worn unit's transmitter when an anomalous event such as a change in acceleration or subject's position with respect to the gravity vector, in the form of a radio frequency (RF) signal at process block 210 and received by the facility transceivers 110 at process block 220.

In one implementation, the RF signal transmitted by the unit transceiver 124 at process block 210 is a signal having a low power mode such as 1 mW and an upper bound governed by the maximum RF output power of which the body-worn unit's transmitter is capable. To conserve battery power, the body-worn unit may transmit initially at a very low power (e.g., 1 mW) and then "listen" for (wait for arrival of) a transmitted RF acknowledgement from the facility unit or units. If the acknowledgement is not "heard" (received) by the body-worn unit's circuitry within a reasonable duration (e.g., 5 milliseconds) the body-worn unit's programming will automatically raise the transmitted power level and again "listen" for an acknowledgement, in repeated steps until the maximum RF output power of which the transmitter is capable of is achieved. The unit may then continue to transmit at its maximum power until the battery is exhausted, as defined by RF signal parameters as shown at process block 212. The RF signal transmission may be triggered by, for example a change of acceleration or position with respect to the gravity vector of the subject, as shown at process block 214. For example, a relatively large acceleration greater than a preset level (e.g., a few tenths of a gravity) in any of the orthogonal directions, previously described, may indicate that the subject has fallen, and can be compared to a fall event threshold programmed into the software or firmware of a processor 120 to determine whether the subject has fallen, as will be described in more detail below. In addition, or alternatively, the RF signal may convey or carry data related to the subject, such as a patient identification number, name, address, telephone number(s), social security number, birth date, age, height, weight, blood type, medical conditions, prescription information, and/or any other data that may identify the subject. Further, as shown at process block 216, the RF signal may transmit data representative of the physiological state of the subject. Such data may include, but is not limited to ECG data, locomotion data, respiration data, and/or any physiological data.

Figure 10A:
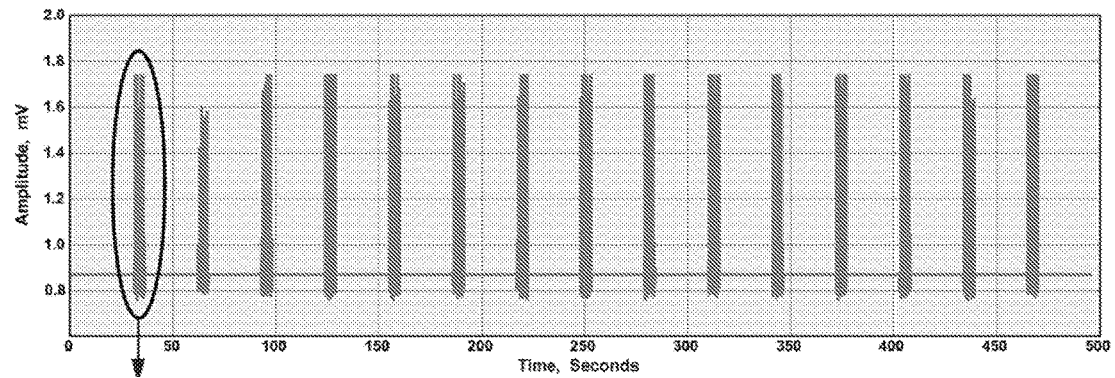
FIG. 10A is a graph showing heart rate data of the subject using ECG connected to the electronic unit over time.
Figure 10B:
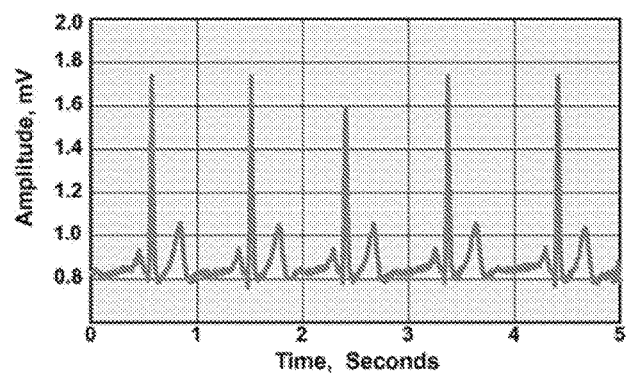
FIG. 10B is a close-up of a portion of the graph of FIG. 10A.

For example, and in reference to FIGS. 10A and 10B that depict plots representing cardiac activity, heart rate data of a subject over time can be monitored by the communications unit 114 and received by a facility transceiver unit 110 and then transmitted to the facility's central computer or controller 122 and viewed on the display 118. A facility transceiver unit 110 is structured as a device that, in operation, is removably or fixately plugged in an electrical outlet in a wall of the facility in electrical communication with electrical power wiring in the wall. The facility transceiver of the unit 110 bidirectionally communicates with the system processor/computer either wirelessly or via the power wiring already pre-installed in the wall. The second incarnation may be beneficial in a situation when the wireless communications in the facility are abundant and, therefore, prone to interference resulting in reduction of signal-to-noise ratio. At the same time, the use of the pre-installed wiring for bidirectional communication between the unit(s) 110 and the controller reduces the cost of the overall system. Additionally or alternatively, the facility transceiver(s) can be operably connected to send signals to the system's processor through separately installed coaxial or optical cables.

The system 100, as shown in FIG. 1, has sufficient bandwidth (e.g., a few tens of KHz to 100 KHz about the chosen carrier center frequency) to transmit such digitized analog signals. As but a single possible example, the controller 122 incorporated into the electronic unit 114 coupled to the subject may be programmed to transmit ECG signals in 5-second bursts every 30 seconds. Such physiological data may be pertinent in the event that the system 100 detects that a subject has fallen in the indoor facility 104.

Referring again to FIG. 2, as the RF signal is sent by the body-worn unit's transmitter 124 at process block 210 to the facility transceivers 110 at process block 220, RF interference patterns are formed, as shown at process block 218. RF interference patterns are formed as a result of reflection and scattering of the RF signal off of interfering objects (such as, for example, walls, doors, windows, furniture) within the indoor facility 104. Thus, the RF signal acquired by the facility transceivers 110 is received from and/or on the background of an RF interference pattern formed at least in part by the RF signal from the body-worn unit's transmitter 124. Once the RF signal is acquired by two or more of the facility transceivers 110 at process block 220, the facility transceivers 110 exploit the RF interference pattern and produce corresponding outputs that are received by the facility's central computer or other processor 120 at process block 228, as will be discussed in further detail below.

In yet another embodiment of the system, multiple facility transceivers may receive the RF signal from the body-worn unit of the fallen resident. However, because the facility transceivers will be located at different fixed distances from the fallen resident, the arrival time of the RF signal will be different at the different facility transceivers. The absolute time of arrival of the RF signal at the different facility transceivers may be transmitted to the central computer by coaxial cable or wirelessly using a different range of frequencies, for example through the building's AC power distribution network. The central computer, using a master clock accurate and stable to sub-nanosecond levels, will determine the time difference of arrival of the signal from the different facility transceivers and, with the use of a time difference of arrival triangulation method, determine the fallen resident's location. Further refining this location will be performed by the facility computer's ability to exclude "impossible regions" from consideration, such as inside facility walls or between floors in a large facility.

In yet another embodiment of the system, facility transceivers (facility transceiver units) are located within each room, apartment, sub-area of the facility, with the location within the facility of each transceiver maintained in a table stored in the central computer. In such a case, the facility transceiver unit nearest to the fallen resident will be the only facility transceiver to send a signal back to the central computer/processor; and the identification of the location of the fallen resident can be then effectuated with the use of a simple lookup table. The facility transceiver may send its signal back to the central computer through separately installed coaxial or optical cables, or wirelessly and, optionally, within a different range of frequencies than those used by the body-worn units, or back through the building's AC power distribution network.

In one implementation, as the facility transceivers 110 produce the corresponding outputs, the facility transceiver 110 nearest the subject 102 may be programmed to send an acknowledgement RF signal back to the unit transceiver 124 at process block 222 in response to receiving the initial RF signal from the body-worn unit. If the body-worn unit's RF receiver 124 does not receive the acknowledging RF signal within a preset period of time (e.g., several milliseconds) at process block 224, the control software in the body-worn unit will increase the power of its transmitted RF signal (i.e., increase the power amplitude of the RF signal) at process block 226 in a body-worn unit's transmitter. The power of the transmitted RF signal can be increased until it achieves its maximum value (such as, for example, 80-100 mW). The transmission from the battery 126 at such highest-power level may continue until the battery of the body-worn unit 114 is exhausted. However, if the body-worn unit's receiver does receive the acknowledging RF signal within the preset period of time at process block 224, the body-worn unit's transmitter 124 will continue to transmit the "fall detected" signal (at the level of power required for such signal to reach the facility's transceiver(s)) until dispatched assistance for the fallen individual arrives.

Since the communications unit 114 is powered by the battery 126, the communications unit 114 may need recharging or battery replacement at varying intervals. Because the subjects 102 (such as residents of the eldercare facility) may not remember to replace the battery 126, the body-worn unit's software and communications 114 may be configured, for example, to transmit a signal representative of a "low-level battery" and associated with a given subject, so that the support staff in the indoor facility 104 can assure that the batteries 126 in the subject's communications unit 114 do not become completely discharged. Further, since the body-worn unit's control software is configured to increase the transmitted RF power in steps until the facility's transceivers have acknowledged receipt of the signal and/or maximum output power is achieved, the body-worn unit is capable of successfully transmitting the RF signal to the facility transceivers 110 even when the subject has fallen face-down, for example, on the floor and the communications unit 114 is covered by the subject's body.

Figure 2:
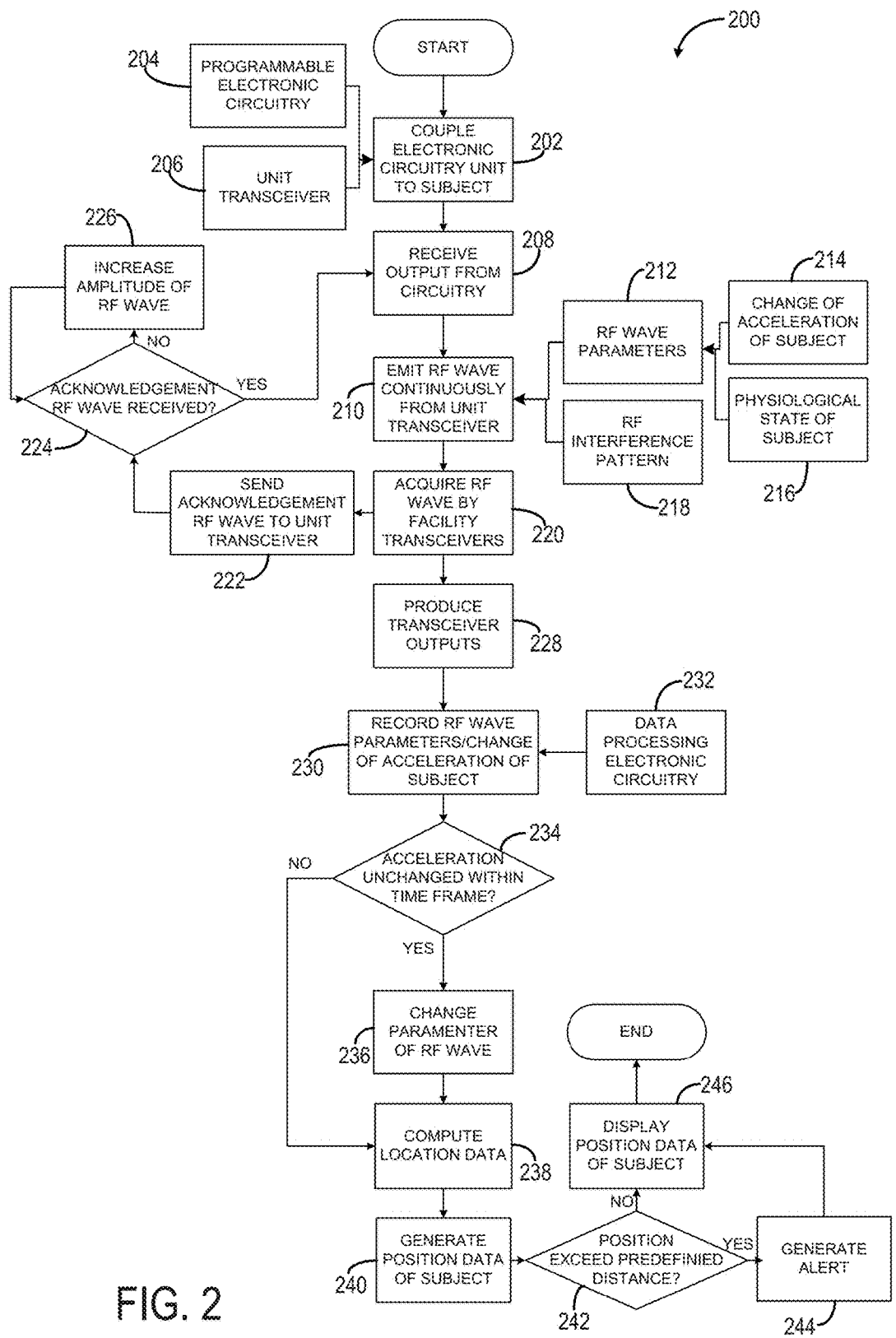
FIG. 2 is a flow chart setting forth the steps of one non-limiting example of a method for identifying the position of the subject within the facility with respect to FIG. 1.

Returning now to process block 228 in FIG. 2, once the facility transceivers 110 exploit the RF interference pattern and produce corresponding outputs that are received by the facility's central computer or other processor 120 at process block 232, the central computer or other processor 120 identifies the RF alerting signal of the subject 102 at process block 230. A fall of the subject 102 is likely to be characterized by a relatively large acceleration to be identified by the kinematic sensor 128 in one or more of the orthogonal directions x, y, z as previously described, and a warning signal transmitted by the body-worn unit's transmitter 124 to two or more of the facility transceivers 110 and detected by the central computer or other processor 120. The body-worn unit's software or controller 122 may include program code, for example, that causes the body-worn unit's transmitter 124 to update the RF signal at process block 236 if there is no detected change in acceleration data within a predetermined time-frame at process block 234.

The occurrence of updating the RF wave (for example, changing its amplitude or otherwise modulating the carrier signal in some predetermined manner) in response to the acceleration of the subject 102 that remains substantially unvaried after the change of the acceleration has been determined (i.e., the subject has likely fallen and is unable to rise from the fallen position), initiates the processor 120 to compute position data related to the subject 102 within the indoor facility 104 at process block 238, as will be described in further detail below. If, however, the change in acceleration data continues to change within the predetermined time-frame at process block 234 (i.e., the subject has not fallen, or the subject has fallen and was able to rise from the fallen position) the processor 120 will still compute location data of the subject at process block 238 since the location of the subject 102 may be continuously tracked by the system 100.

To compute location data representing the location of the subject 102 at process block 238, the processor 120 is connected to a clock source 130, as shown in FIG. 1. Such clock source may be configured with, for example, nanosecond time resolution. The clock source 130 or other processor or controller may be configured to determine a first moment when the RF signal transmitted by the unit transceiver 124 is received by one of the facility transceivers 110. Additionally, the clock source 130 is configured to determine a second moment when the RF signal transmitted by the unit transceiver 124 is received by another one of the facility transceivers 110, and so on. Thus, the difference between the first moment and the second moment indicates a time delay that is the result of the varying distances from the unit transceiver 124 coupled to the subject 102 and the facility transceivers 110 positioned throughout the indoor facility 104 that are acquiring the RF signal. Accordingly, during calibration of the system 100, the processor 120 is programmed with the distance from each facility transceiver 110 to the processor 120 at the central base station 112. These known distances can be factored out of the time delays between receipt of the RF signal by multiple facility transceivers 110, thereby leaving a series of time delays between the subject's unit transceiver 124 and several facility transceivers 110. Knowing that the RF signal travels at approximately 1 nanosecond per foot in free space, a "triangulation" can be computed from the delayed signals to generate data of the subject 102 within a few feet within the indoor facility at process block 240.

After the location data of the subject 102 is generated at process block 238, the processor 120 may detect if the subject's 102 location exceeds a predefined distance from the facility transceivers 110 at process block 242, thereby indicating whether the subject, who may or may not have fallen, has left or is attempting to leave the indoor facility 104, as is common in subjects with dementia, for example. The processor 120 may be programmed with the distance from each facility transceiver 110 to the processor 120 at the central base station 112, as previously described, and thus the location of each facility transceiver 110 is known. Therefore, the processor 120 may be further configured with a threshold distance between the communications unit 114 worn by the subject 102 and any one of the facility transceivers 110 that should not be exceeded.

In one implementation, if the location of the subject 102 is determined at process block 242 to be farther from the facility transceivers than the threshold distance, the processor 120 generates an alert at process block 244 indicating the subject may have left or is leaving the indoor facility 104. The alert may be any type of audible and/or visual alert to indicate to the staff, for example, of the indoor facility 104 that the subject 102 has departed. Following the alert, the location data of the subject 102 may be displayed on the display 118 of the processor 120 at process block 246. The location of the subject 102 may be overlaid on a schematic view of the indoor facility 104, for example so that assistance can be dispatched promptly to the location of the subject. If, however, the location of the subject 102 is within the threshold distance as determined at process block 242, the location of the subject 102 is simply displayed on the display 118 at process block 246 and assistance is dispatched to the subject 102. This latter situation, for example, may arise if the subject is within the building, but has wandered into an area that is "off limits" to the residents, for example, building engineering spaces or staff offices. In addition, the grounds surrounding the facility, which may include open spaces, such as a patio or garden, can be similarly monitored by placing wired or wireless facility transceivers in those areas external and adjacent to the facility, with appropriate weather-proofing of the facility units as required.

Figure 3:
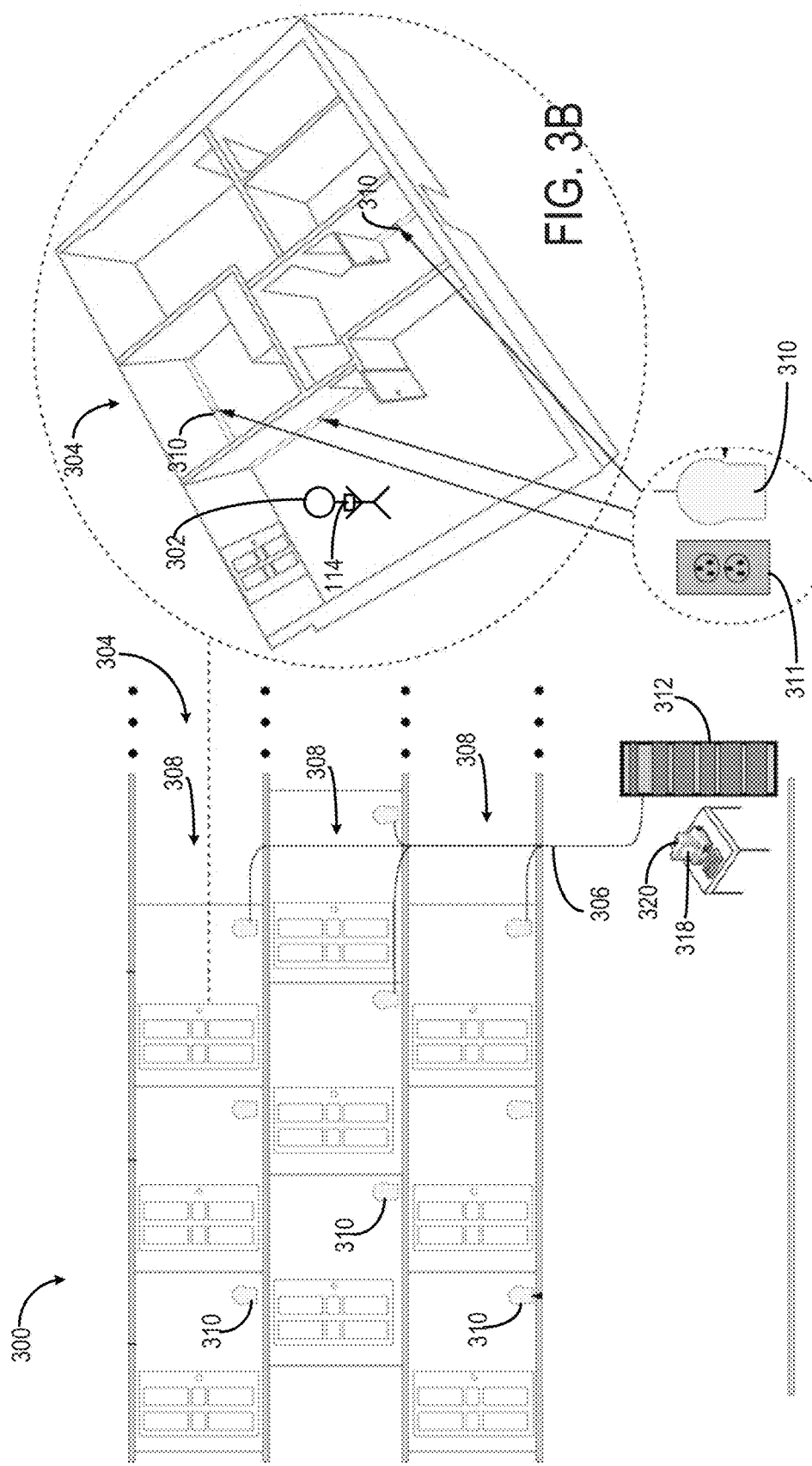
FIG. 3A is a diagram illustrating another implementation of the system for identifying the position of the subject using one of several facility transceivers within a facility in accordance with another aspect of the present invention.
FIG. 3B is a top perspective view of FIG. 3A showing the locations of the facility transceivers.
FIG. 3C is a close-up view of one of the facility transceivers shown in FIGS. 3A and 3B.
Figure 4:
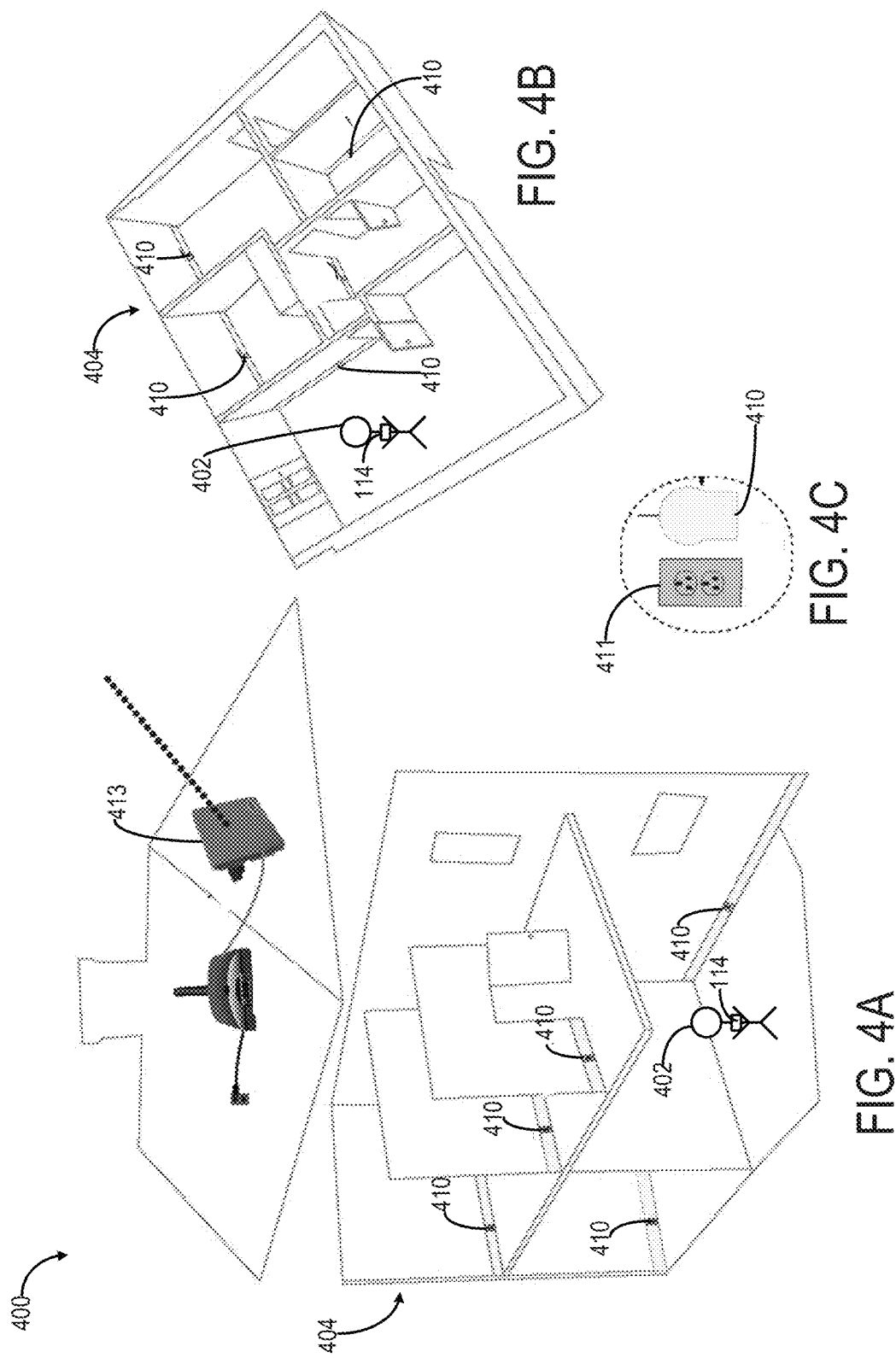
FIG. 4A is a diagram of a system similar to that of FIG. 3A for identifying the position and/or related information of the subject within a dwelling.
FIG. 4B is a top perspective view of FIG. 4A showing the installation sites of facility transceivers.
FIG. 4C is a close-up view of one of the facility transceivers shown in FIGS. 4A and 4B.

While the system 100 described above is conducive for new construction of an indoor facility, it may not be ideal for some existing indoor facilities due to the facility transceivers 110 having been already placed in the corridors 108 and connected with coaxial cables back to the central base station 112. However, as shown in FIGS. 3A, 3B, and 3C, a system 300 is conducive for existing dwellings by using baseboard outlets to power the facility transceivers. Similarly, a system 400, as shown in FIGS. 4A, 4B, and 4C is conducive for existing indoor facilities such as eldercare facilities. Similar number labels will be used for corresponding elements between the systems 100, 300 and 400 in the figures.

Referring particularly now to FIGS. 3A, 3B, and 3C, a system 300 is shown that is configured to identify the location of the subject 302 within the indoor facility 304, for example, an eldercare facility. Within the indoor facility 304, are facility transceivers 310 that simply plug and screw into an electrical baseboard plug 311, as shown in FIG. 3C, and are positioned in each apartment or in each room of the indoor facility 304 facility, including in common areas such as cafeterias. The facility transceivers 310 may be, for example, small radio frequency (RF) transceivers, either wired or wireless, that can continuously receive the RF transmission from the communications unit 114, as shown in FIGS. 9A, 9B, 9C, and 9D worn by the subject 302. As previously described, the communications unit 114 is configured to detect or facilitate communications with other systems that can detect when the subject 302 has fallen. However, compared to the system 100 previously described, the system 300 shown in FIGS. 3A, 3B, and 3C includes facility transceivers 310 each having a unique identifier in order to locate the subject 302, as will be described in further detail below. Thus, the communications unit 114 may only need to be in communication with one of the facility transceivers 310 to determine the location of the subject 302. The location of the subject 302 may be shown on a display 318 coupled to processor, such as a networked workstation 320, for example, and overlaid on a schematic view (e.g., a plan view, an orthographic projection, etc.) of the facility 304, so that assistance can be dispatched promptly to the location of the subject 302.

Figure 5:
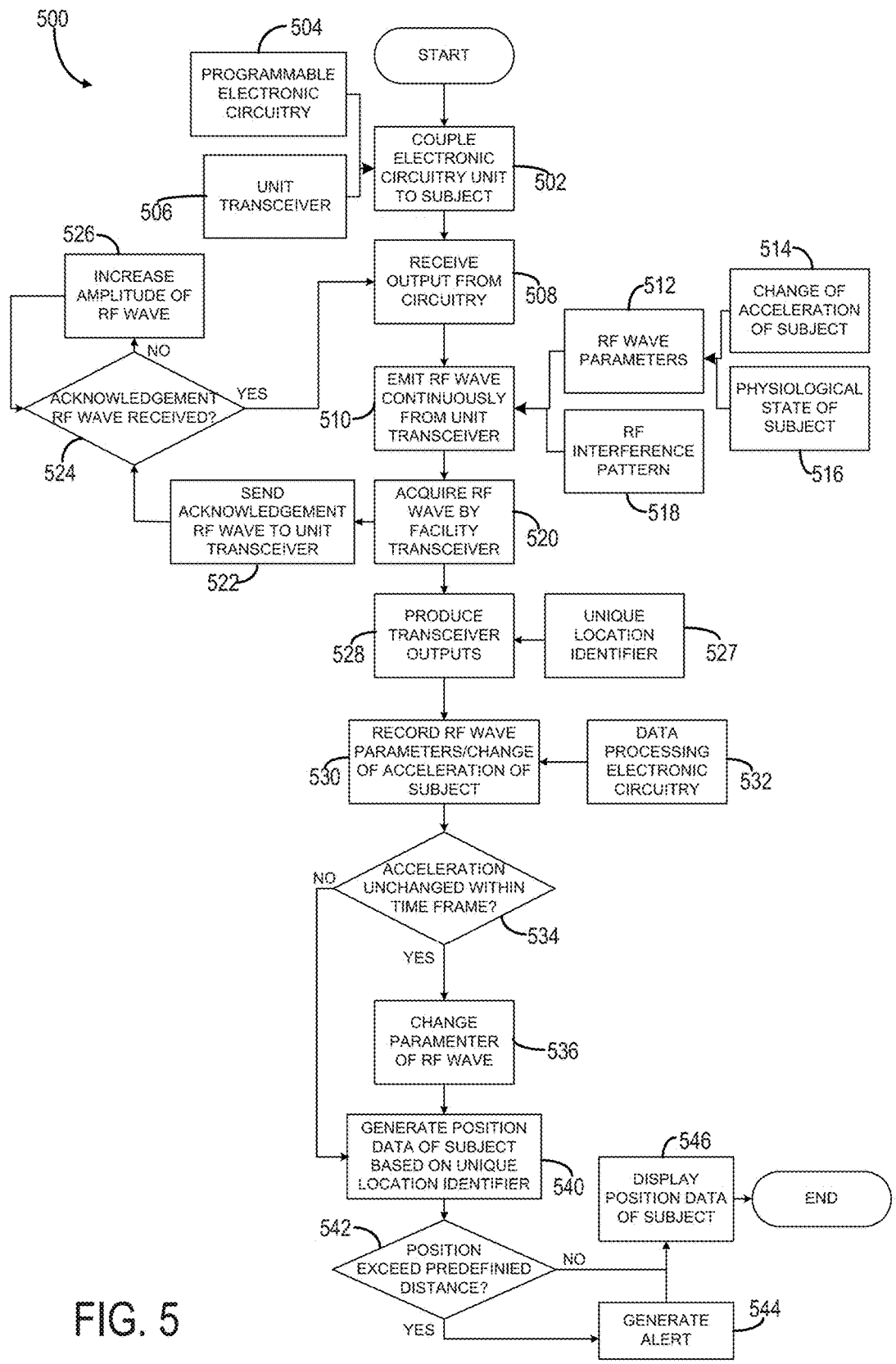
FIG. 5 is a flow chart setting forth the steps of one non-limiting method for identifying the position and/or other information about the subject within the facility with respect to FIGS. 3 and 4.

Referring now to FIG. 5, a flow chart setting forth exemplary steps 500 for identifying the location of the subject within the indoor facility is provided. To start the process, the communications unit 114 (such as that shown in FIGS. 9A, 9B, 9C, and 9D, for example), is operably coupled to the subject at process block 502. As previously described, the communications unit 114, may be a body worn unit that includes, but is not limited to, controller 122, a unit transceiver 124, a battery 126 and a kinematic sensor 128, such as an accelerometer. The controller 122, as shown at process block 504 in FIG. 5, may have program code stored thereon, which code implements an algorithm to detect or facilitate communication with another controller or processor to detect the fall of the subject and their inability to rise from the fallen position. The unit transceiver 124, as shown at process block 506, is configured to continuously (alternatively—at predetermined intervals) receive an output from the kinematic sensor 128 at process block 508. The output of the kinematic sensor 128 may be, for example, data representing the rate of acceleration in three orthogonal directions: x (i.e., anterior-posterior), y (i.e., medial-lateral) and z (i.e., vertical) directions. The output data generated by the kinematic sensor 128 may be continuously transmitted by the unit transceiver 124 in the form of a radio frequency (RF) signal at process block 510 and received by one of the facility transceivers 310 at process block 520.

The RF signal transmitted by the unit transceiver 124 at process block 510 is a signal having an RF power level between e.g., 1 mW and some upper power limit designed into the RF transmitter circuitry, e.g., 80-100 mW, and is defined by RF signal as shown at process block 512. The RF signal may communicate, for example a change of acceleration of the subject, as shown at process block 514. For example, a relatively large acceleration in any of the orthogonal directions, previously described, may indicate the subject has fallen and can be compared to a fall event threshold on the processor 320 to determine whether the subject has fallen. In addition, or alternatively, the RF signal may communicate data related to the subject, such as a patient identification number, name, address, telephone number(s), social security number, birth date, age, height, weight, blood type, medical conditions, prescription information, and/or any other data that may identify the subject. Further, as shown at process block 516, the RF signal may transmit data representative of the physiological state of the subject. Such data may include, but is not limited to ECG data, locomotion data, respiration data, and/or any physiological data.

As the RF signal is continuously transmitted from the unit transceiver 124 of the communications unit 114 at process block 510 to the facility transceivers 310 at process block 520, RF interference patterns are formed (as shown at process block 518). RF interference patterns are formed as a result of the reflection and scattering of the RF signal off of interfering objects (e.g., walls, doors, windows, furniture, etc.) within the indoor facility 304. Thus, the RF signal acquired by the facility transceivers 310 is received from an RF interference pattern formed in part by the RF signal. Once the RF signal is acquired one of the facility transceivers 310 at process block 520, the facility transceiver 310 "interprets" or "decodes" the RF interference pattern and produces a corresponding output that includes the unique identifier, as shown at process block 527, of the corresponding facility transceiver 310. The output is then received by the processor 320 at process block 528, as will be discussed in further detail below.

In one implementation, as the facility transceiver 310 produces the corresponding output, the facility transceiver 110 simultaneously sends an acknowledgement RF signal back to the unit transceiver 124 at process block 522 in response to receiving the initial RF signal. If the unit transceiver 124 of the communications unit 114 does not receive the acknowledgement RF signal within a preset period of time (e.g., milliseconds) at process block 524, the software on the microcomputer that controls the communications unit's RF transmitter will increase the power of its transmitted RF signal (i.e., increase the amplitude of the RF wave) at process block 526 in a stepwise manner, for example, until either the acknowledgement RF signal is received or the communications unit 114 reaches its maximum RF output power. The higher power transmission from the unit's RF transmitter 126 may continue until the unit transceiver's 114 battery is exhausted. However, if the unit transceiver 124 of the communications unit 114 does receive the acknowledgement RF signal within the preset period of time (e.g., milliseconds) at process block 524, the unit transceiver 124 will continue to transmit the fall warning to the facility's transceivers until the subject receives assistance from the facility's care givers.

At process block 528 in FIG. 5, the facility transceiver 310 interprets or decodes the RF interference pattern and produces the corresponding output containing the unique identifier of the facility transceiver 310. The output from the facility transceiver 310 is transmitted through the indoor facility's AC power distribution network 306 and is received by the processor 320 at process block 532. Thus, the processor 320 listens to both sides of the AC power distribution network 306 and identifies the RF signal, changes of acceleration of the subject 302, and the unique identifier of the facility transceiver at process block 530. Similar to the system 100 described above, if the subject 302 falls, for example, a relatively large acceleration is likely to be identified by the kinematic sensor 128 in one of the orthogonal directions and transmitted via the RF signal from the unit transceiver 124 to the nearest facility transceiver 310 and determined by the processor 320. If the change in acceleration data thereafter remains unchanged within a predetermined time-frame at process block 534, the controller 122 may include program code, for example, that causes the unit transceiver 124 to change a parameter, e.g., the modulation pattern, of the RF signal at process block 536.

Updating the RF signal in response to the acceleration of the subject 302 remaining substantially constant (after the change of the acceleration has been determined, which would correspond to the likely event that the subject has fallen and is then unable to rise from the fallen position), initiates the processor 320 to generate location data representing the subject 302 within the indoor facility 304 at process block 540. Since the location and unique identifier of each facility transceiver 310 may be stored in a lookup table on the tangible on-transitory storage medium operably cooperated with the processor 320 upon installation, generating location data of the subject 302 at process block 540 may be accomplished by accessing the lookup table upon receipt of the RF signal transmitted by the facility transceiver 310 and decoding the unique location identifier of the facility transceiver 310. Therefore, by referencing the unique identifier of the facility transceiver 310, the location of the subject 302 is revealed. If, however, the acceleration data indicated that the acceleration of the subject continues to change within the predetermined time-frame at process block 534 (i.e., the subject has not fallen, or the subject has fallen and was able to rise from the fallen position), the processor 320 may still generate location data of the subject at process block 540.

After the location data of the subject 302 is generated at process block 540, the processor 320 may detect if the subject 302 is located at a distance that exceeds a predefined distance from one of the facility transceivers 310 at process block 542, thereby indicating whether the subject, who may or may not have fallen, has left or is attempting to leave the indoor facility 304. If the distance to the location of the subject 302 exceeds the threshold distance at process block 542, the processor 320 generates an alert at process block 544 indicating the subject may have left or is leaving the indoor facility 304. Following the alert, the location data of the subject 302 may be displayed on the display 318 of the processor 320 at process block 546. The location of the subject 302 may be overlaid on a schematic view or map of the indoor facility 304, for example so that assistance can be dispatched promptly to the location of the subject. If, however, the distance to the location of the subject 302 does not exceed the threshold distance at process block 542, the location of the subject 302 may simply be displayed on the display 318 at process block 546 and assistance dispatched to the subject 302 if deemed necessary by the facility's staff.

Turning now to FIGS. 4A, 4B, and 4C, the system 400 is shown and includes similar features as previously described with respect to the system 300 for identifying a location of a subject within an indoor facility, such as an eldercare facility. However, the system 400 shown in FIGS. 4A, 4B, and 4C are used in a large dwelling 404 (e.g., a home) and the processor is at a remote location. Accordingly, the system 400 includes an integrated radio and antenna 413 to transmit the RF signal from the facility transceivers 410 to the processor (not shown) at a remote location.

Figure 6:
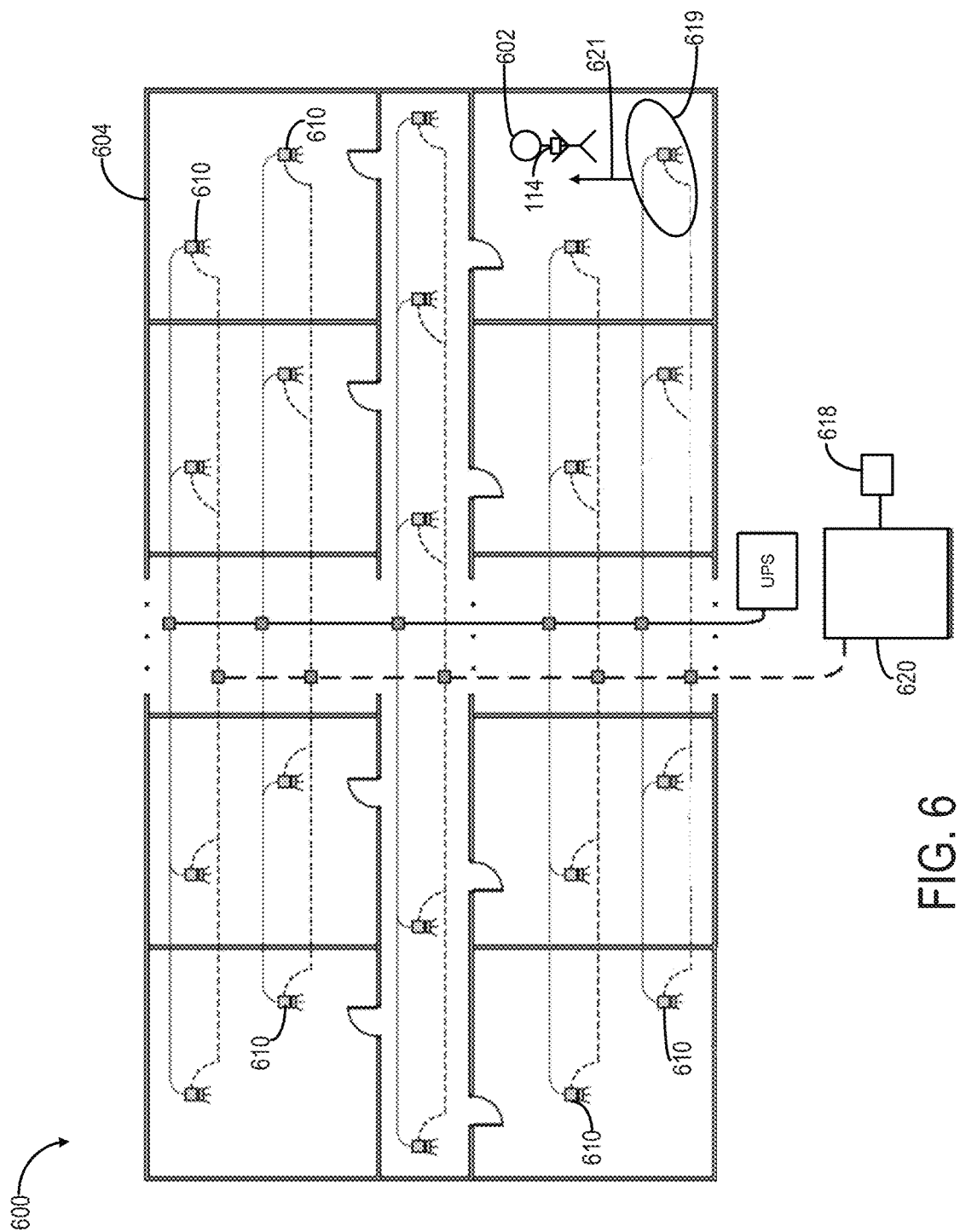
FIG. 6 is a diagram illustrating another implementation of the system for identifying the position or other information about the subject using a tri-polarized antenna and receiver system within the indoor facility in accordance with another aspect of the present invention.

In another embodiment of the present disclosure, a system 600 for identifying a position of a subject 602 within an indoor facility 604 is shown in FIG. 6. Within the indoor facility 604, are tri-polarized antenna and receiver assemblies 610 that are positioned in each apartment or in each room of the indoor facility 604 facility, including in common areas such as cafeterias. The tri-polarized antenna and receiver assemblies 610 may be, for example, a receiver 615 coupled to an antenna portion 617, as shown in FIGS. 7A, 7B, 7C, and 7D. More specifically, the antenna portion 617 may be single or dual patch antennas as shown in FIGS. 7A and 7C. Alternatively, the antenna portion 617 may be single or dual polarization antennas as shown in FIG. 7B or monopole or dipole antennas as shown in FIG. 7D The monopole or dipole configurations represent traditional antenna structures, such as might be used for WiFi applications, and offer some unique advantages. Dipole and monopole antenna implementations may be made to be easily interchangeable for different operational frequencies and may be made to be tunable to mitigate influence from the environment in which they are installed. Further, antenna ports may be located on multiple surfaces of the assembly, allowing customization at the time of installation if needed. The patch antenna configuration offers a lower physical profile, although with less flexibility than the monopole/dipole alternative, but may be desirable for aesthetic or physical location considerations. Additionally, the patch antenna may be implemented at a lower cost with the use of a printed-circuit-board technology. Regardless of the configuration of the antenna portion 617, the tri-polarized antenna and receiver assemblies 610 may be either wired or wireless and can continuously receive the RF transmission from the communications unit 114, as shown in FIGS. 9A, 9B, 9C, and 9D worn by the subject 602. As previously described, the communications unit 114 is configured to detect when the subject 602 has fallen. The communications unit 114 may only need to be in communication with one of the tri-polarized antenna and receiver assemblies 610 to determine the position of the subject 602. The position of the subject 602 may be shown on a display 618 coupled to processor, such as a networked workstation 620, for example, and overlaid on a schematic view of the indoor facility 604, so that assistance can be dispatched promptly to the location of the subject 602.

The above-described tri-polarized antenna approach is one of a variety of different approaches that can be used to exploit the RF interference patters. For example, it is contemplated that a RF signal received directly from the body-worn unit may be used to carry out the present invention. However, the above-described approaches when using the tri-polarized antenna can "read" the interference patters due to reflections, refractions, and the like of the RF signal and can interpret or decode these interferences patters. To this end, while two or more tri-polarized antenna systems is desired for carrying out location identification, there is a special case where a single tri-polarized antenna may be sufficient.

In general, an electromagnetic wave emitted from a transmitting device in an indoor environment undergoes a varied amount of depolarization and other types of distortion such as multipath effects due to interaction with objects, such as people and furniture, as well as the building structure such as walls, floors, doors, and the like. In academia, theoretical models have been developed that focus on improving multiple input multiple output (MIMO) performance based on optimization of antenna polarization parameters.

Since the tri-polar antenna configuration already includes mutually orthogonal antennas, the three orthogonal field components of the resultant electromagnetic wave, at a given receiver position, can be directly measured by the receiver as given in (1).

$$\vec{S} = (S_x, S_y, S_z) \qquad (1)$$

A Fourier transform of the signal vectors leads to the spectral field components (2).

$$\vec{F}(\vec{r}, \omega) = \begin{pmatrix} Fx(\vec{r}, \omega) \\ Fy(\vec{r}, \omega) \\ Fz(\vec{r}, \omega) \end{pmatrix} \qquad (2)$$

From the spectral field components, multiple methods may be used to solve for the parameters that describe the polarization ellipse, including the normal to the plane of the ellipse, as given in (3).

$$\vec{N} \stackrel{\text{def}}{=} (\vec{N_x}, \vec{N_y}, \vec{N_z}) = i(\vec{D}X\vec{F^*}) \qquad (3)$$

Unlike a system, such as MIMO, that may use antenna polarization optimization for improving communications performance, a unique system is realized in this embodiment in which one or more receivers disbursed in a 2D area, such as a single floor eldercare facility, or in a 3D volume, such as a multilevel facility, are used together for location and tracking purposes.

Radio location of an individual in an indoor environment is typically very difficult to achieve due to multipath propagation and absorption from the building structure and objects within the building. Several methods have been developed, such as fingerprinting, in which the communications paths for multiple receiver and transmitter combinations are sampled and the sampled results are used to estimate the location of another transmitter of unknown location. Such methods are complex and typically have poor accuracy for indoor location applications.

By using a tri-polarized antenna receiver system within the systems and methods of the present invention, such obstacles can be overcome by determining the normal to the polarization ellipse. Based on the normal to the plane of the polarization ellipse, the present invention can determine the direction (heading) from the receiver to the transmitter. The present invention is expandable to include multiple receivers that can be combined to determine the two dimensional or three dimensional position of the transmitter within the environment. A variation of the system can be further extended to include other signals such as those emitted from acoustic or ultrasonic sources.

The method by which tracking and locating is achieved, and the accuracy of the position estimation, depends on the number of receivers that are within range for a given transmitted signal. For a single receiver, angle of arrival estimation based on (3) may be used in combination with a distance estimate based on received signal strength (RSS). For the single receiver scenario, RSS can be used with an indoor propagation model to estimate a distance between the transmitter and receiver. The estimated distance defines a circle, or sphere, of radius r, which when intersected by a line defined by $\vec{N}$, results in a location estimate. Although the accuracy of the single receiver configuration may be somewhat limited due to the complex indoor multipath environment, location estimation results may be improved through a combination of utilizing tracking history of the subject, as well as physical properties of the structure, (for example, a receiver located near a corner composed of outside walls controls the volume of the potential location solution space).

Position estimations in which two or more receivers are available with sufficient signal strength will result in improved position estimation. The two or more receiver configuration may use a combination of $RSS_i$ and $\vec{N_i}$ from i receivers to construct a set of distance circles, or spheres, and normal vector based lines between transmitter and receivers. Such multi-receiver configurations offer the advantage that, as more receivers are added to the position estimation calculation, an over-determined set of equations is realized. This allows position estimation outliers to be dropped from the solution, which in turn further increases position estimation accuracy. Additionally, position history from tracking may be used to control erroneous position estimates and further refine the position estimation accuracy.

Figure 8:
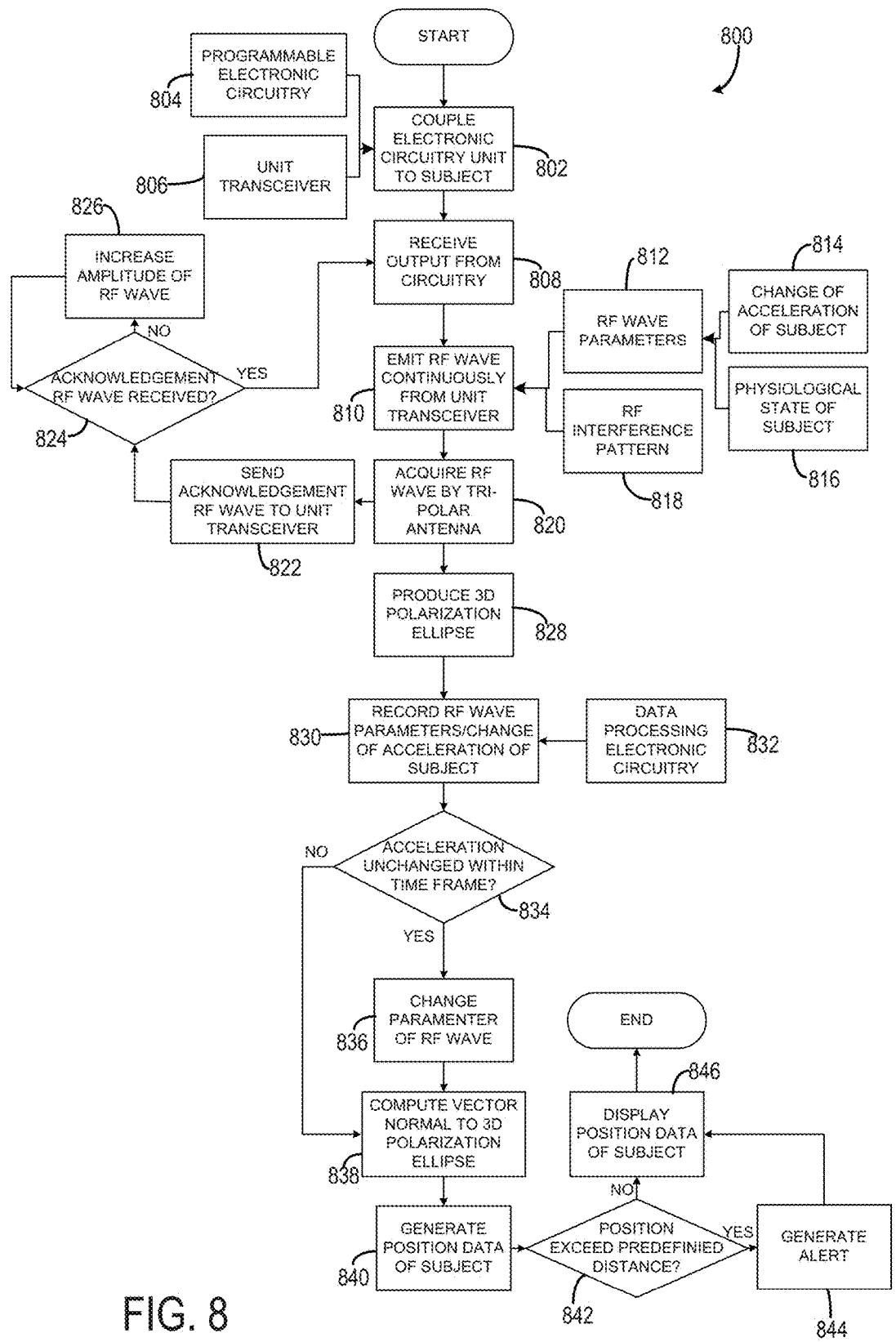
FIG. 8 is a flow chart setting forth the steps of one non-limiting method for identifying the position or other information about the subject within the facility with respect to FIG. 6.

Referring now to FIG. 8, an example of a flow chart setting forth steps 800 for identifying the location of the subject within the indoor facility is provided. To start the process, the communications unit 114 is coupled to the subject at process block 802. As previously described, the communications unit 114, may be a body worn unit that includes, but is not limited to, 122, a unit transceiver 124, a microcontroller loaded with control software, a battery 126 and a kinematic sensor 128, such as an accelerometer. The controller 122, as shown at process block 804 in FIG. 8, may have program code stored thereon, which code implements an algorithm governing the circuitry 122 to detect the fall of the subject and their inability to rise from the fallen position; the program code stored on the microcontroller also controls the output of the unit's RF transceiver. The unit's microcontroller 124, as shown at process block 806, is configured to continuously, or at predetermined intervals, receive an output from the kinematic sensor 128 at process block 808. Under the control of the microcontroller's software, output data generated by the kinematic sensor 128 may be continuously transmitted by the unit transceiver 124 in the form of a radio frequency (RF) signal at process block 810 and received by two or more of the tri-polarized antenna and receiver assemblies 610 at process block 820.

The RF signal transmitted by the unit transceiver 124 at process block 810 is a signal having a power between for example 1 mW and a maximum power of which the unit's RF transmitter is capable of, in the range of, e.g., 80-100 mW, and is defined by RF signal as shown at process block 812. The RF signal may communicate, for example a change of acceleration of the subject, as shown at process block 814. For example, a relatively large acceleration in any of the orthogonal directions, as previously described, may indicate that the subject has fallen, and can be compared to a fall event threshold on the processor 620 to determine whether the subject has fallen. In addition, or alternatively, the RF signal may communicate data related to the subject, such as a patient identification number, name, address, telephone number(s), social security number, birth date, age, height, weight, blood type, medical conditions, prescription information, and/or any other data that may identify the subject. Further, as shown at process block 816, the RF signal may transmit data representative of the physiological state of the subject. Such data may include, but is not limited to ECG data, locomotion data, respiration data, and/or any physiological data.

In one implementation, the RF signal is continuously transmitted from the unit transceiver 124 of the electronic circuitry unit 114 at process block 810 to the tri-polarized antenna and receiver assemblies 610 at process block 820, and RF interference patterns are formed, as shown at process block 818. RF interference patterns are formed as a result of the reflection and scattering of the RF signal off of interfering objects (e.g., walls, doors, windows, furniture, etc.) within the indoor facility 604. Thus, the RF signal acquired by the tri-polarized antenna and receiver assemblies 610 is received from an RF interference pattern formed in part by the RF signal. Once the RF signal is acquired by one of the tri-polarized antenna and receiver assemblies 610 at process block 820, the tri-polarized antenna and receiver assemblies 610 interprets or "decodes" the RF interference pattern and produces a corresponding polarization ellipse 619 oriented in three dimensional (3D) space at process block 828. The three dimensional (3D) polarization ellipse 619 is then received by the processor 620 at process block 830, as will be discussed in further detail below.

As the tri-polarized antenna and receiver assembly 610 produces the corresponding 3D polarization ellipse 619, as shown in FIG. 6, the tri-polarized antenna and receiver assembly 610 simultaneously sends an acknowledgement RF signal back to the unit transceiver 124 at process block 822 in response to receiving the initial RF signal. If the unit transceiver 124 of the electronic circuitry unit 114 does not receive the acknowledgement RF signal within a preset period of time (e.g., milliseconds) at process block 824, the control software running on the microcontroller will instruct the communications unit 114 to increase the power of its transmitted RF signal (i.e., increase the amplitude of the RF wave) at process block 826 in a stepwise manner, for example, until either the acknowledgement RF signal is received or the communications unit 114 reaches its maximum designed output power, e.g., 80-100 mW. The higher power transmission may continue until the communications unit's 114 battery 126 is exhausted. However, if the unit transceiver 124 of the communications unit 114 does receive the acknowledgement RF signal within the preset period of time (e.g., milliseconds) at process block 824, the unit transceiver 124 will continue to transmit a fall alert signal as directed by the control software on the microcontroller.

At process block 828 in FIG. 8, the tri-polarized antenna and receiver assembly 610 interprets or decodes the RF interference pattern and produces the corresponding 3D polarization ellipse 619. The data corresponding to the 3D polarization ellipse 619 is transmitted from the tri-polarized antenna and receiver assembly 610 and received by the processor 620 at process block 832. The processor 620 identifies the RF signal and changes of acceleration of the subject 602 communicated thereby at process block 830. Similar to the system 100 described above, if the subject 302 falls, for example, a relatively large acceleration is likely to be identified by the kinematic sensor 128 in one of the orthogonal directions and transmitted via the RF signal from the unit transceiver 124 to the nearest tri-polarized antenna and receiver assembly 610 and determined by the processor 620. If the change in acceleration data remains further unchanged within a predetermined time-frame at process block 834, the controller 122 may include program code, for example, that causes the unit transceiver 124 to update the RF signal by, e.g., changing the RF signal's modulation pattern at process block 836.

Updating the RF signal in response to the unchanged acceleration of the subject 302 after the change of the acceleration has been determined (i.e., the subject has likely fallen and is unable to rise), initiates the processor 620 to compute a vector 621, as shown in FIG. 6, normal to the 3D polarization ellipse 619 at process block 838. Calculating the vector 621 normal to the 3D polarization ellipse 619 over time, thus provides a direction and location of the initial RF signal transmitted by the unit transceiver 124 so that location data related to the subject 602 within the indoor facility 604 can be generated at process block 840. For example, processes such as generally described by Panahandeh et al., "A time-variant statistical model for the polarization of received electromagnetic waves in indoor communication channels," Workshop on Computing, Networking and Communications, pgs. 262-266 (2012) and Carozzi et al., "Parameters characterizing electromagnetic wave polarization," Physical Review, Vol. 61, No. 2 (2000), which are both incorporated herein by reference, may be extended into the systems and methods described herein for these and other purposes. If however, the change in acceleration data changes within the predetermined time-frame at process block 834 (i.e., the subject has not fallen, or the subject has fallen and was able to rise from the fallen location) the processor 620 will still generate location data of the subject at process block 840.

After the location data of the subject 602 is generated at process block 840, the processor 620 may detect if the subject 602 is located at a distance that exceeds a predefined distance from one of the tri-polarized antenna and receiver assemblies 610 at process block 842, thereby indicating whether the subject, who may or may not have fallen, has left or is attempting to leave the indoor facility 604. If the location of the subject 602 exceeds the threshold distance at process block 842, the processor 620 generates an alert at process block 844 indicating the subject may have left or is leaving the indoor facility 604 or the grounds adjacent to the facility, e.g., an outdoor patio or garden, if those spaces are also being monitored. Following the alert, the location data of the subject 602 may be displayed on the display 618 of the processor 620 at process block 846. The location of the subject 602 may be overlaid on a schematic view of the indoor facility 604, for example so that assistance can be dispatched promptly to the location of the subject. If, however, the location of the subject 602 does not exceed the threshold distance at process block 842, the location of the subject 602 may simply be displayed on the display 618 at process block 846 and assistance is dispatched to the subject 602.

It is understood, therefore, that embodiments of the invention provide a system for identifying a location of a subject relative to a facility. Such system includes a kinematic sensor with electronic circuitry wired to detect a change in at least one of position, velocity, and acceleration thereof; a communications unit; and a housing structured to facilitate coupling of the kinematic sensor with the subject. The communications unit includes an electronic controller configured to receive feedback from the kinematic sensor; and a unit transceiver controlled by the controller to transmit a first radio frequency (RF) signal communicating the change in at least one of position, velocity, and acceleration. (In one implementation, such first RF signal has a power between about 0.001 mW and 1 W.) The system further includes at least two facility transceiver units in fixed locations and configured to extract the first RF signal relative to an RF interference pattern in the facility and to produce an output signal distinguishing the first RF signal from the RG interference; and a processor (in operable communication with the at least two transceiver units) configured to receive the output signal and generate data representative of a location of the kinematic sensor relative to the fixed locations. In one embodiment, the electronic controller is wired to cause the unit transceiver to change a parameter of the first RF signal in response to the kinematic sensor detecting a lack of change in acceleration over a predetermined time-frame after the kinematic sensor detects a change of acceleration. The system may additionally include a display device coupled to the processor and configured to display at least one of the location of the subject and a position of a subject using the data representative of the position generated by the processor. The processor communicates with at least two facility transceiver units either wirelessly or through a power wire pre-installed in the facility. In one implementation, the processor is programmed to analyze a change in at least one of position, velocity, and acceleration to determine if the subject has fallen and/or to determine a facility transceiver unit nearest the communications unit and, based on such determination, to configure said facility transceiver unit to transmit an acknowledgement RF signal back to the communications unit in response to the first RF signal having been received by said facility transceiver unit. The communications unit further includes a battery and is programmed to increase the transmit power of the first RF signal when the acknowledgement RF signal is not received by the communications unit. In one embodiment, the communications unit contains a physiological monitor subsystem configured to communicate data representing a physiological state of the subject to the controller in the first RF signal. In this case, the data representing the physiological state of the subject includes at least one of a patient identification number, ECG data, locomotion data, and respiration data. In one implementation, the processor is configured to perform a triangulation process to identify a location of the communications unit relative to a fixed location from the fixed locations. In a related embodiment, the system additionally includes a clock source operably connected with the processor and configured to measure a first time delay between transmission of the first RF signal by the unit transceiver and receiving the first RF signal by a first of the at least two facility transceivers relative to a second time delay between transmission of the first RF signal by the unit transceiver and receiving the first RF signal by a second of the at least two facility transceivers. In another related embodiment, the processor is programmed to generate an alert when a separation between the communications unit and one of the at least two transceivers reaches a first predetermined value and the separation between the communications unit and another of the at least two transceivers reaches a second predetermined value. (The first predetermined separation value from one transceiver units is used to alert that the subject is being monitored, while the second predetermined separation value could be used to determine that the subject has left the identified area).

Embodiments also provide a method for identifying a location of a subject relative to an indoor facility. The method includes a step of coupling a kinematic sensor to the subject to detect a change in at least one of position, velocity, and acceleration of the subject; and a step of transmitting an RF signal with a communications unit responsive to the kinematic sensor to communicate the change in at least one of position, velocity, and acceleration of the subject. The method additionally includes acquiring said RF signal by at least two facility transceiver units disposed in fixed locations by interpreting an RF interference pattern caused by the RF signal in the indoor facility; as well as determining a relative location of the subject with respect to the fixed locations and a change in at least one of position, velocity, and acceleration of the subject with a processor that is in communication with the at least two facility transceiver units. The method finally includes a step of generating a report indicating the relative location of the subject. The step of coupling, in one implementation, includes placing on a subject a pendant containing the kinematic sensor, a microcontroller, a battery, and the communications unit. Generation of a report includes displaying the relative location of the subject on a map of the indoor facility. The step of acquiring the RF signal by the at least two facility transceiver units contains, in one implementation, transmitting an acknowledgement RF signal to the communications unit in response to the RF signal having been received by the at least two facility transceivers. In such a case, the method further includes increasing power of the RF signal transmitted by the communications unit if the acknowledgement RF signal is not received by the communications unit. In a related embodiment, the method includes continuously transmitting the RF signal with the communications unit to provide data representative of a physiological state of the subject; and the data, that are representative of the physiological state of the subject, include at least one of a patient identification number, ECG data, locomotion data, and respiration data. In another related embodiment, the method contains programming the at least two facility transceiver units to store a predefined distance between the at least two facility transceiver units and compute a triangulation of the communications unit using the RF signal. The step of determining includes one of i) bidirectionally transmitting a signal, over a power wire of the indoor facility, between at least one facility transceiver unit and the processor, and ii) wirelessly transmitting a signal between at least one facility transceiver unit and the processor. Alternatively or in addition, the method also includes measuring a first time delay between transmitting the RF signal by the communications unit and receiving the RF signal by a first of the at least two facility transceiver units relative to a second time delay between transmitting RF signal by the communications unit and receiving the RF signal by a second of the at least two facility transceiver units. In such a case, the method additionally includes comparing the first time delay and the second time delay to determine a proximity of the communications unit to each of the first and the second of the at least two facility transceiver units and, optionally, generating an alert when the proximity of the communications unit to one of the first and the second of the at least two facility transceiver units is greater than a predetermined value.

Embodiments additionally provide a system for identifying a location of a subject relative to an indoor facility. The system includes a kinematic sensor (wired to detect a change in at least one of position, velocity, and acceleration); a communications unit including i) a controller configured to receive feedback from the kinematic sensor; and ii) a unit transceiver controlled by the controller to transmit a first RF signal communicating the change in at least one of position, velocity, and acceleration. The system further contains a housing enclosing the kinematic sensor and structured to facilitate coupling of the kinematic sensor with the subject; and at least one facility transceiver unit configured to acquire the first RF signal and generate an output signal containing information from the first signal. Finally, the system includes a processor programmed in communication with the at least one facility transceiver unit to receive the output signal and to determine a unique location identifier of the at least one facility transceiver unit to derive, from at least the output signal and the unique location identifier, a location of the subject relative to the at least one facility transceiver unit. In one implementation, the communications unit includes program code, stored on a tangible non-transitory storage medium thereof, for causing the unit transceiver to change a parameter of the first signal in response to the at least one of the position, velocity, and acceleration remaining substantially unchanged within a predetermined time-frame. The system may also include a display device in communication with the processor and configured to display the location of the subject relative to the at least one facility transceiver unit. The electronic circuitry of at least one facility transceiver unit is further wired to transmit an acknowledgement RF signal back to the communications unit in response to the first RF signal having been received by the at least one facility transceiver unit. At least one facility transceiver unit includes at least one tri-polarized antenna configured to acquire an RF signal and produce a three dimensional polarization ellipse, in which case the processor is programmed to determine a position of the subject relative to a vector that is normal to the three dimensional polarization ellipse. In a specific embodiment, the vector normal to the three dimensional polarization ellipse indicates a direction and location of the first RF signal emitted by the unit transceiver. At least one tri-polarized antenna of the system includes at least one of a single patch antenna, a dual patch antenna, a single polarization antenna, a dual polarization antenna, a monopole antenna, and a dipole antenna. In a specific embodiment, at least one facility transceiver unit is in electrical communication with the processor over a power wire and the processor is programmed to receive the output signal over said power wire, while in another specific embodiment the processor and the at least one facility transceiver unit are operably connected wirelessly.

While the description of the invention is presented through the above examples of embodiments, those of ordinary skill in the art understand that modifications to, and variations of, the illustrated embodiments may be made without departing from the inventive concepts disclosed herein. The invention should not be viewed as being limited to the disclosed examples.

References made throughout this specification to "one embodiment," "an embodiment," "a related embodiment," or similar language mean that a particular feature, structure, or characteristic described in connection with the referred to "embodiment" is included in at least one embodiment of the present invention. Thus, appearances of these phrases and terms may, but do not necessarily, refer to the same implementation. It is to be understood that no portion of disclosure, taken on its own and in possible connection with a figure, is intended to provide a complete description of all features of the invention.

It is also to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed.

If the schematic flow chart diagram is included, it is generally set forth as a logical flow-chart diagram. As such, the depicted order and labeled steps of the logical flow are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Without loss of generality, the order in which processing steps or particular methods occur may or may not strictly adhere to the order of the corresponding steps shown. The invention as recited in claims appended to this disclosure is intended to be assessed in light of the disclosure as a whole.

It is appreciated that at least some of the processing steps resulting in transformation of data, acquired with the use of the system of the invention, can be performed with the use of a processor controlled by instructions stored in a tangible, non-transitory storage memory. The memory may be random access memory (RAM), read-only memory (ROM), flash memory or any other memory, or combination thereof, suitable for storing control software or other instructions and data. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

The invention as recited in claims appended to this disclosure is intended to be assessed in light of the disclosure as a whole, including features disclosed in prior art to which reference is made.

The invention claimed is:

1. A system for identifying a location of a subject relative to a facility, the system comprising:
   a kinematic sensor configured to detect a change in at least one of position, velocity, and acceleration thereof;
   a communications unit including:
      a controller configured to receive feedback from the kinematic sensor; and
      a unit transceiver controlled by the controller to transmit a first radio frequency (RF) signal representing the change in at least one of position, velocity, and acceleration;
   a housing structured to facilitate coupling of the kinematic sensor with the subject;
   at least two facility transceiver units in corresponding fixed locations, said at least two facility transceiver units configured to extract the first RF signal, relative to RF signal patterns that are caused by reflection and scattering of said first RF signal off of objects in the facility and that reduce a signal-to-noise ratio of said first RF signal, to produce an output signal; and
   a processor in operable communication with the at least two transceiver units, the processor configured to receive the output signal and generate data representative of a location of the kinematic sensor relative to the corresponding fixed locations.

2. The system according to claim 1, wherein the controller is configured to increase power of the first RF signal in response to the kinematic sensor detecting a lack of change in acceleration over a predetermined time-frame after the kinematic sensor detects a change of acceleration.

3. The system according to claim 1, further comprising a display device coupled to the processor and configured to display at least one of the location of the subject and a position of a subject using the data representative of the position generated by the processor, and wherein the processor is in operable communication with the at least two facility transceiver units either wirelessly or through a power wire pre-installed in the facility.

4. The system according to claim 1, wherein the processor is further configured to analyze the change in at least one of position, velocity, and acceleration to determine if the subject has fallen.

5. The system according to claim 1, wherein the processor is further programmed to determine a facility transceiver unit nearest the communications unit and, based on such determination, to configure said facility transceiver unit to transmit an acknowledgement RF signal back to the communications unit in response to the first RF signal having been received by said facility transceiver unit nearest the communications unit.

6. The system according to claim 5, wherein the communications unit further includes a battery and is programmed to increase the transmit power of the first RF signal when the acknowledgement RF signal is not received by the communications unit.

7. The system according to claim 1, wherein the communications unit contains a physiological monitor subsystem configured to communicate data representing a physiological state of the subject to the controller in the first RF signal.

8. The system according to claim 7, wherein the data representing the physiological state of the subject includes at least one of a patient identification number, ECG data, locomotion data, and respiration data.

9. The system according to claim 1, wherein the processor is programmed to store a predefined distance between the at least two facility transceiver units and, based at least in part on said stored predefined distance, perform a triangulation process to identify a location of the communications unit relative to the fixed locations.

10. The system according to claim 1, further comprising a clock source operably connected with the processor and configured to measure a first time delay between transmission of the first RF signal by the unit transceiver and receiving the first RF signal by the first facility transceiver unit relative to a second time delay between transmission of the first RF signal by the unit transceiver and receiving the first RF signal by the second facility transceiver unit.

11. The system according to claim 1, wherein the unit transceiver is structured to transmit the first RF signal with a power level that is changed, between about 0.001 mW and 1 W, depending on receipt, by the communications unit, of an RF acknowledgement signal from a facility transceiver unit, said RF acknowledgement signal generated by at least one facility transceiver unit from said at least two facility transceiver units upon receiving of said first RF signal, and
   wherein said RF signal patterns are formed as patterns of RF signal interference between the first RF signal and signals representing reflection and scattering of the first RF signal off of the objects in the facility.

12. The system according to claim 1, wherein the processor is programmed to generate an alert when a separation between the communications unit and a first facility transceiver unit reaches a first predetermined value and the separation between the communications unit and a second facility transceiver unit reaches a second predetermined value.

13. The system according to claim 1, wherein a facility transceiver unit from the at least two facility transceiver units is in electrical communication with the power wire of the facility, said electrical communication being operable to bidirectionally transmit a signal over the power wire between said facility transceiver unit and the processor.

14. A system for identifying a location of a subject relative to an indoor facility, the system comprising:
   a kinematic sensor configured to detect a change in at least one of position, velocity, and acceleration;
   a communications unit including:
      a controller configured to receive feedback from the kinematic sensor; and
      a unit transceiver controlled by the controller to transmit a first radio frequency (RF) signal communicating the change in at least one of position, velocity, and acceleration, the unit transceiver configured to vary a power level of said first RF signal, a housing enclosing said kinematic sensor therein and structured to facilitate coupling of the kinematic sensor with the subject;

at least one facility transceiver unit configured to acquire said first RF signal, generate an acknowledgement RF signal in response to having acquired said first RF signal, and generate an output signal containing information from the first signal; and a processor programmed in communication with the at least one facility transceiver unit to receive the output signal and to determine a unique location identifier of the at least one facility transceiver unit to derive, from at least the output signal and the unique location identifier, a location of the subject relative to the at least one facility transceiver unit, wherein the power level of said first RF signal is varied when the RF acknowledgement signal is not received by the communications unit in a predetermined time-frame.

15. The system according to claim 14, wherein the communications unit includes program code, stored on a tangible non-transitory storage medium thereof, for causing the unit transceiver to change said power level of the first RF signal in response to the at least one of the position, velocity, and acceleration remaining substantially unchanged within the predetermined time-frame.

16. The system according to claim 14, wherein
said at least two facility transceiver units are configured to extract the first RF signal from a signal pattern that is caused by interference among the first RF signal and signal representing reflection and scattering of said first RF signal off of objects in the facility and that reduces a signal-to-noise ratio of said first RF signal.

17. The system according to in claim 14, wherein each of the at least one facility transceiver unit is configured to transmit an acknowledgement RF signal back to the communications unit in response to the first RF signal having been received by said facility transceiver unit.

18. The system according to claim 14, wherein the at least one facility transceiver unit includes at least one tri-polarized antenna configured to acquire an RF signal and produce a three dimensional (3D) polarization ellipse.

19. The system according to claim 18, wherein the processor is configured to determine a position of the subject relative to a vector normal to the three dimensional polarization ellipse.

20. The system according to claim 19, wherein the vector normal to the three dimensional polarization ellipse indicates a direction and location of the first RF signal emitted by the unit transceiver.

21. The system according to claim 18, wherein the at least one tri-polarized antenna includes at least one of a single patch antenna, a dual patch antenna, a single polarization antenna, a dual polarization antenna, a monopole antenna, and a dipole antenna.

22. The system according to claim 14, wherein the at least one facility transceiver unit is in a bidirectional electrical communication with the processor over a power wire and the processor is programmed to receive the output signal over said power wire.

23. The system according to claim 14, wherein the communications unit contains a physiological monitor subsystem configured to communicate data representing a physiological state of the subject to the controller in the first RF signal.

24. The system according to claim 23, wherein the data representing the physiological state of the subject includes at least one of a patient identification number, ECG data, locomotion data, and respiration data.

* * * * *

UNITED STATES PATENT AND TRADEMARK OFFICE
CERTIFICATE OF CORRECTION

PATENT NO. : 9,635,514 B2
APPLICATION NO. : 14/678285
DATED : April 25, 2017
INVENTOR(S) : Barry K Gilbert et al.

Page 1 of 1

It is certified that error appears in the above-identified patent and that said Letters Patent is hereby corrected as shown below:

Column 13, Line 50, Eq. (3), " $\vec{N}\underline{def}(\overrightarrow{N_x},\overrightarrow{N_y},\overrightarrow{N_z}) = i(\vec{D}X\vec{F^*})$ ," should be -- $\vec{N}\underline{def}(\overrightarrow{N_x},\overrightarrow{N_y},\overrightarrow{N_z}) = i(\vec{F}X\vec{F^*})$ --.

Signed and Sealed this
Second Day of January, 2018

Joseph Matal
*Performing the Functions and Duties of the*
*Under Secretary of Commerce for Intellectual Property and*
*Director of the United States Patent and Trademark Office*